United States Patent
Manzolati

(10) Patent No.: US 7,506,328 B2
(45) Date of Patent: Mar. 17, 2009

(54) METHOD AND SYSTEM FOR OPTIMIZING PERFORMANCE OF AN APPARATUS

(75) Inventor: Richard J. Manzolati, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 471 days.

(21) Appl. No.: 10/072,776

(22) Filed: Feb. 11, 2002

(65) Prior Publication Data

US 2003/0153996 A1 Aug. 14, 2003

(51) Int. Cl.
*G06F 9/45* (2006.01)
(52) U.S. Cl. .............................. 717/151; 710/8; 710/66
(58) Field of Classification Search ................. 717/751, 717/151

See application file for complete search history.

(56) References Cited

U.S. PATENT DOCUMENTS

| | | | | |
|---|---|---|---|---|
| 4,609,939 A * | 9/1986 | Kozawa et al. | ................. | 348/95 |
| 5,124,732 A | 6/1992 | Manzer et al. | | |
| 5,153,609 A | 10/1992 | Ando et al. | | |
| 5,272,518 A * | 12/1993 | Vincent | ...................... | 356/405 |
| 5,398,257 A * | 3/1995 | Groenteman | ................ | 375/130 |
| 5,457,644 A * | 10/1995 | McCollum | .................. | 708/230 |
| 5,517,236 A * | 5/1996 | Sergeant et al. | ............. | 348/143 |
| 5,619,285 A * | 4/1997 | Kobayashi | ................... | 348/806 |
| 5,642,301 A * | 6/1997 | Warrior et al. | ............... | 702/104 |
| 5,714,937 A * | 2/1998 | Campana, Jr. | ............ | 340/573.1 |
| 5,740,801 A * | 4/1998 | Branson | ..................... | 600/407 |
| 5,761,614 A * | 6/1998 | Leitch et al. | ................. | 455/254 |
| 5,787,338 A * | 7/1998 | Priest | .......................... | 455/69 |
| 5,907,344 A | 5/1999 | Tanimoto et al. | | |
| 5,995,916 A * | 11/1999 | Nixon et al. | ................. | 702/182 |
| 6,032,208 A * | 2/2000 | Nixon et al. | ................... | 710/64 |
| 6,195,591 B1 * | 2/2001 | Nixon et al. | ................... | 700/83 |
| 6,230,307 B1 * | 5/2001 | Davis et al. | .................... | 716/16 |
| 6,282,684 B1 * | 8/2001 | Kondo et al. | ................ | 714/752 |
| 6,289,259 B1 * | 9/2001 | Choi et al. | .................. | 700/197 |
| 6,334,178 B1 * | 12/2001 | Cannon et al. | ................ | 712/28 |

(Continued)

FOREIGN PATENT DOCUMENTS

EP          0851312 A          7/1998

(Continued)

OTHER PUBLICATIONS

Catthoor, Francky; Dutt, Nikil: "Hot topic session: How to solve the current memory access and data transfer bottlenecks: at the processor architecture or at the compiler level?", p. 426-433, ACM 200, retrieved Nov. 17, 2004.*

(Continued)

*Primary Examiner*—Wei Zhen
*Assistant Examiner*—Phillip H Nguyen
(74) *Attorney, Agent, or Firm*—Nixon Peabody LLP

(57) ABSTRACT

A method for optimizing performance of an apparatus includes interrogating at least one part of the apparatus to obtain information about the at least one part. Once the at least one part is interrogated, instructions for optimizing at least one operation of the apparatus is determined based on the obtained information about the at least one part. Next, the instructions are applied to the at least one operation of the apparatus to optimize the performance.

18 Claims, 2 Drawing Sheets

U.S. PATENT DOCUMENTS

| | | | |
|---|---|---|---|
| 6,353,841 B1 * | 3/2002 | Marshall et al. | 708/232 |
| 6,438,356 B1 * | 8/2002 | Lilja et al. | 455/63.1 |
| 6,446,123 B1 * | 9/2002 | Ballantine et al. | 709/224 |
| 6,473,036 B2 * | 10/2002 | Proctor, Jr. | 342/372 |
| 6,486,769 B1 * | 11/2002 | McLean | 340/10.32 |
| 6,494,370 B1 * | 12/2002 | Sanchez | 235/454 |
| 6,538,347 B1 * | 3/2003 | Baranowski et al. | 307/137 |
| 6,589,791 B1 * | 7/2003 | LaBudde et al. | 436/55 |
| 6,781,399 B2 * | 8/2004 | Cho | 324/765 |
| 6,781,682 B1 * | 8/2004 | Kasai et al. | 356/138 |
| 6,785,872 B2 * | 8/2004 | Carter | 716/3 |
| 6,813,371 B2 * | 11/2004 | Kakinami | 382/104 |
| 6,892,144 B2 * | 5/2005 | Slater et al. | 702/61 |
| 2003/0033038 A1 * | 2/2003 | Paris et al. | 700/90 |
| 2003/0033441 A1 * | 2/2003 | Forin et al. | 709/315 |
| 2003/0135637 A1 * | 7/2003 | Huang et al. | 709/232 |
| 2003/0151789 A1 * | 8/2003 | Hamoir | 359/239 |
| 2003/0210698 A1 * | 11/2003 | Rouleau | 370/397 |
| 2004/0207862 A1 * | 10/2004 | Such et al. | 358/1.9 |

FOREIGN PATENT DOCUMENTS

| | | |
|---|---|---|
| GB | 2363477 A | 12/2001 |

OTHER PUBLICATIONS

Fahs, Brian; Bose, Satarupa; Crum, Matthew; Slechta, Brian; "Performance Characterization of a Hardware mechanism for Dynamic Optimization", p. 16-27, 2001 IEEE, retrieved Nov. 17, 2004.*

Hammes, Jeff; Rinker, Bob; Bohm, Wim; Najjar, Walid; "Cameron: High Level Language Compilation for Reconfigurable Systems", Parallel Architectures and Compilation Techniques 1999, Proceedings, IEEE, retrieved Nov. 17, 2004.*

Li, Suet-Fei; Wan, Marlene; Rabaey, Jan; "Configuration Code Generation and Optimizations for Heterogeneous Reconfigurable DSPS", p. 169-180. 1999 IEEE, retrieved Nov. 17, 2004.*

* cited by examiner

METHOD AND SYSTEM FOR OPTIMIZING PERFORMANCE OF AN APPARATUS

FIELD OF THE INVENTION

This invention relates generally to methods and systems for optimizing performance and, more particularly, to a method and system for optimizing performance of at least one operation of an apparatus using data obtained from at least one part of the apparatus.

BACKGROUND OF THE INVENTION

Typically, complex interactive devices each have one or more parts that carry out one or more operations. Ideally, the part or parts execute each operation at an optimal or desired level which will vary based on the particular device and the operation. Unfortunately, the part or parts in each device may not always operate at the optimal level.

A variety of factors can effect how well each of the operations is carried out by the part or parts, such as tolerances in one or more operating characteristics of each of the parts. The greater the range in the tolerances in a particular part, the greater the chance that the parts will not execute the operation at the optimal level.

One solution has been to use parts whose tolerances in one or more operating characteristics are within a range that will result in the operation being executed at the optimal level. Unfortunately, parts with the acceptable range for the tolerances are usually the "higher end" or most expensive parts. As a result, the overall cost of the device goes up when these parts are used.

Another solution has been to try and strike a compromise between the performance of the device and the tolerances for the parts needed to achieve an acceptable performance level. This helps to keep the overall cost of the device down, but often results in a device that does not always operate at the optimal level, has lower reliability, and still has a higher cost than may be necessary.

SUMMARY OF THE INVENTION

A method in accordance with embodiments of the present invention includes interrogating at least one parts of the apparatus to obtain information about each of the parts. Once the parts are interrogated, instructions for optimizing at least one operation of the apparatus are determined based on the obtained information. Next, the instructions are applied to the at least one operation of the apparatus.

An apparatus in accordance with embodiments of the present invention includes one or more parts, an information component for at least one of the parts, and an optimization processing system. The information component has data about the part, such as functional parameters or algorithms about the part. The optimization processing system determines instructions for optimizing at least one operation of the apparatus based on the data and applies the instructions to the at least one operation of the apparatus.

Embodiments of the present invention provide a method and system for operating an apparatus at an optimal level while using parts with relaxed or changing characteristics and/or tolerances. When parts in the apparatus are changed or are replaced, the present invention is able to dynamically adjust to maintain the optimal or desired level of performance. The use of parts with relaxed tolerances also helps to reduce the overall cost of the apparatus, without sacrificing performance because less expensive parts which have wider ranges of tolerances can be used.

DETAILED DESCRIPTION OF THE INVENTION

Figure 1:
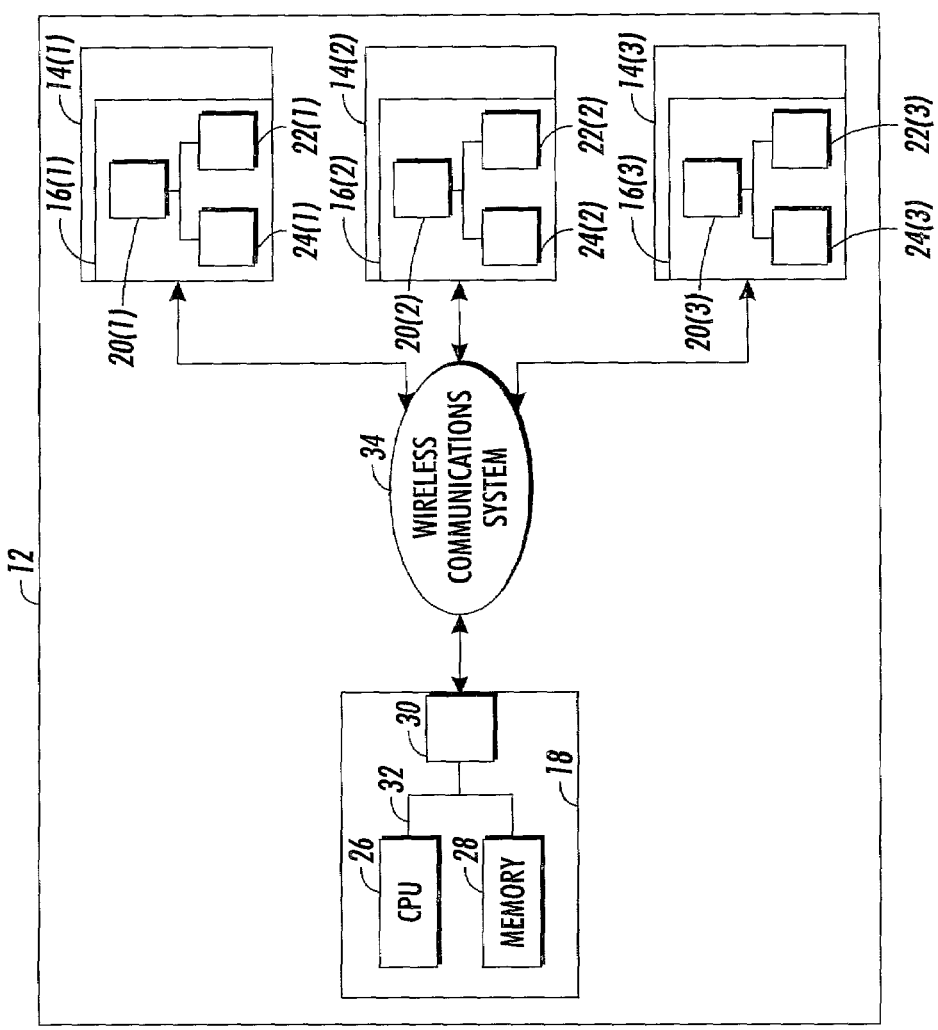
FIG. 1 is a block diagram of a system for optimizing the performance of a apparatus in accordance with the present invention.

An apparatus 12 in accordance with one embodiment of the present invention is illustrated in FIG. 1. The apparatus 12 includes parts 14(1)-14(3), an information component 16(1)-16(3) for each of the parts 14(1)-14(3), and an optimization processing system 18. The present invention provides several advantages including providing a apparatus 12 which operates at an optimal or desired level of performance while using parts 14(1)-14(3) with relaxed tolerances.

Referring to FIG. 1, apparatus 12 can be any type of machine, device, or system, such as a printer or a copy machine. In this particular embodiment, apparatus 12 includes parts 14(1)-14(3), although the number and types of parts can vary depending upon the particular apparatus 12. The parts 14(1)-14(3) are used to carry out one or more operations for the apparatus 12.

Parts 14(1)-14(3) can each be any type of part, parts, subassembly, assembly, or system for apparatus 12. In this particular embodiment, each of the parts 14(1)-14(3) has an information component 16(1)-16(3) which stores data about the part, such as one or more functional parameters about the part or one or more algorithms used in the part, although all parts 14(1)-14(3) in a apparatus 12 may not have an information component 16(1)-16(3). The types of parts 14(1) -14(3) which may have an information component 16(1)-16(3) can vary based on the particular application. Each of the information components 16(1)-16(3) has a processor 20(1)-20(3) to execute programmed instructions for the one or more operations of the part 14(1)-14(3), a memory 22(1)-22(3) to store the information about the part 14(1)-14(3), and a transceiver system 24(1)-24(3) to receive requests for the information and to transmit the information, although each of the information components 16(1)-16(3) can have other numbers and types of elements.

Apparatus 12 also includes an optimization processing system 18, although the optimization processing system 18 may be located outside of the apparatus 12. In this particular embodiment, the optimization processing system 18 includes a central processing unit (CPU) or processor 26, a memory 28, and a transceiver system 30 which are coupled together by a bus system or other link 32, respectively, although the optimizing processing system may comprise other components, other numbers of the components, and other combinations of the components. Additionally, in this particular embodiment, the optimization processing system 18 optimizes one or more operations of the apparatus 12 and also controls the operations of the apparatus 12, although other configurations are possible, such as having an apparatus processing system which controls the operations of the apparatus 12 and is separate from the optimization processing system 18.

Figure 2:
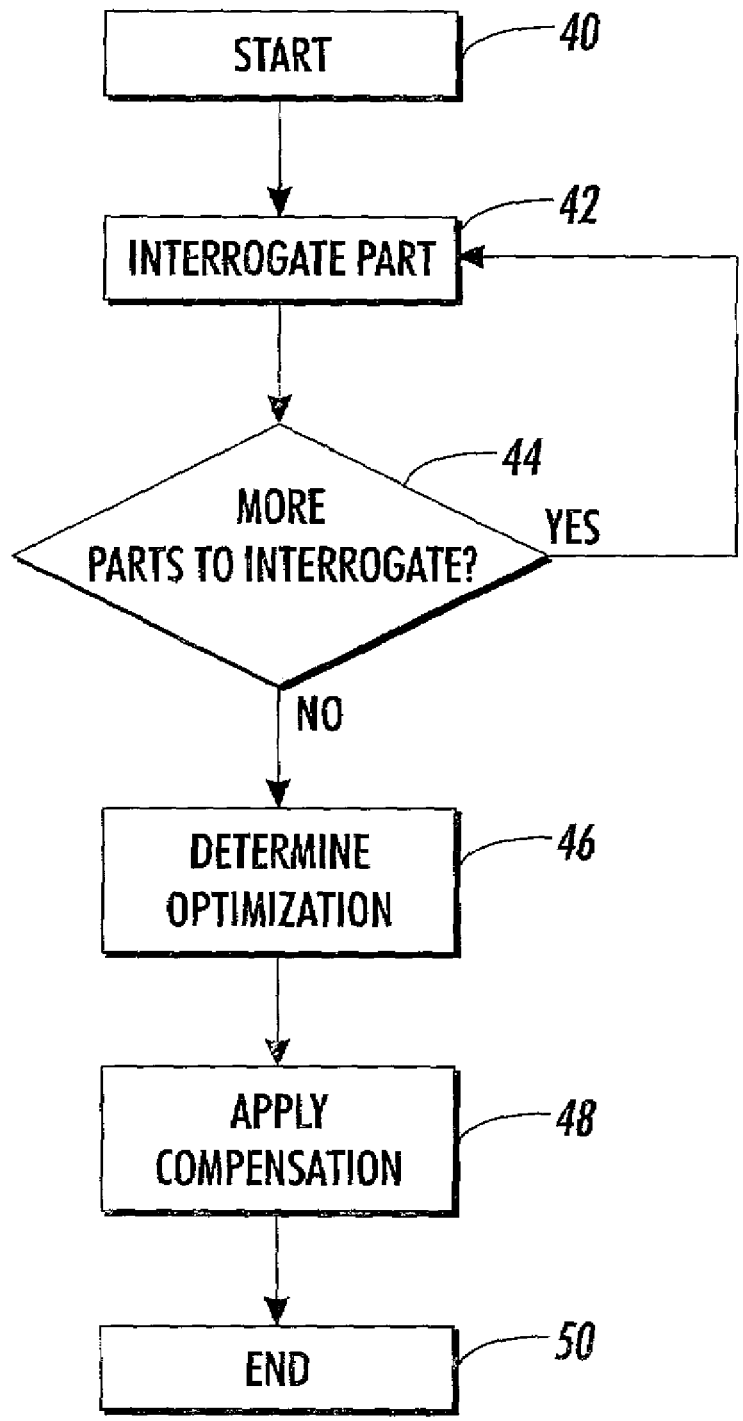
FIG. 2 is a flow chart of a method for optimizing the performance of a apparatus in accordance with the present invention.

The processor 26 executes one or more programs of stored instructions for the method for optimizing performance of one or more operations of the apparatus 12 in accordance with one embodiment of the present invention as illustrated in FIG. 2 and as described herein. Processor 26 and/or one or more of the processors 20(1)-20(3) may also execute one or more programs of stored instructions for operating parts 14(1)-14 (3) of the apparatus 12.

The memory 28 stores the programmed instructions discussed above, although some or all of those programmed instructions could be stored and retrieved from one or more memories at other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for memory 28.

The transceiver systems 30 and 24(1)-24(3) are used to operatively couple and communicate between the optimization processing system 18 and the information components 16(1)-16(3). In this particular embodiment, a wireless communication network or system 34 is used, although other types of communication systems and protocols can be used, such as a communication system with direct hard wire connections between optimization processing system 18 and the information components 16(1)-16(3).

A method for optimizing the performance of an apparatus 12 in accordance with one embodiment of the present invention will now be described with reference to FIGS. 1 and 2. In step 40, the method for optimizing performance of one or more operations of the apparatus 12 starts.

Next, in step 42 optimization processing system 18 via the wireless communication system interrogates one of the information components 16(1) -16(3) for one of the parts 14(1)-14(3). Information or data about the part 14(1), 14(2) or 14(3), such as one or more functional parameters or algorithms about the operation of the part 14(1), 14(2) or 14(3), are transmitted to optimization processing system 18. The particular parts 14(1), 14(2) and/or 14(3) interrogated will depend on the particular operation or operations being optimized. The particular operation or operations being optimized can be selected by the operator of the apparatus 12 or in other manners, such as automatically based on a programmed schedule. By way of example only, in an apparatus 12, such as a digital copier or a laser printer, the information from a part 14, such as a photoreceptor or laser diodes, might be electrical discharge characteristics, i.e. a photo discharge curve, of the photoreceptor or the light intensity from the laser diodes. Although in this particular example optimization processing system 18 polls the part or parts 14(1)-14(3) for information, other methods for supplying the information can be used, such as having one or more of the information components 16(1)-16(3) automatically transmit the information to the optimization processing system 18 when installed or when the part 14(1), 14(2) or 14(3) is going to be used in an operation for the apparatus 12.

In step 44, optimization processing system 18 determines if any more parts 14(1)-14(3) of the apparatus 12 need to be interrogated. The particular parts 14(1)-14(3) interrogated by optimization processing system 18 will depend upon the particular operation or operations that the optimization processing system 18 is optimizing and the part or parts 14(1)-14(3) involved in that operation or operations. If more parts 14(1)-14(3) need to be interrogated, the Yes branch is taken back to step 42 and another part is interrogated as described above. If no more parts 14(1)-14(3) need to be interrogated, then the No branch is taken to step 46. By way of example only, an apparatus 12, such as a copier or laser printer, has parts 14, such as photoreceptors, a bias charge roll, and a full erase light which are all coupled to power supplies. The photoreceptors are manufactured with voltage specification tolerances that identify the highest voltage (V high) they will accept from a charging device, such as the bias charge roll, and the lowest voltage (V low) they will have when discharged by light intensity from an erasing device, such as the full erase light. The V high and V low form part of a photo discharge curve for the photoreceptors. These photoreceptors also have other electrical charge characteristics, which are known as Tribo values, and also have cycle down or up characteristics. The bias charge roll also has electrical resistance characteristics and the full erase light has light intensity characteristics that effect each of their performance. The reaction of the photoreceptors to black or color toner in the apparatus is based on these tolerances and characteristics for the photoreceptors, the bias charge roll, and the full erase light and determines the resolution and density of marks transferred to paper from the photoreceptors. As the photoreceptors produce continuous prints, these tolerances and characteristics for the photoreceptors, bias charge roll, and full erase light can change which changes the resolution and density of marks transferred to paper.

In step 48, optimization processing system 18 optimizes one or more operations of the apparatus 12 based on the obtained information about one or more of the parts 14(1)-14(3) and develops instructions to be executed by one or more parts 14(1)-14(3) of the apparatus 12. In one embodiment, the obtained information about the one or more parts 14(1)-14(3) could be compared against stored or prior information about the parts 14(1)-14(3) to obtain a difference. The optimization processing system 18 would then use the difference to determine the instructions to optimize the operation to correct or adjust for this difference. By way of example only, in an apparatus 12, such as a copier or laser printer, the optimization processing system 18 would use the gathered information, such as the current tolerances and characteristic of parts 14, such as photoreceptors, bias charge roll, and full erase light which are coupled to the power supplies, to determine the instructions for optimizing a printing operation. In this particular example, the instructions would adjust the power provided by the power supplies to the photoreceptors, bias charge roll, and/or full erase light, to produce the best print by apparatus 12, although other instructions could be provided.

In step 48, optimization processing system 18 transmits the instructions for optimizing the operation to one or more of the parts 14(1)-14(3) to be applied. The processors 20(1)-20(3) in the parts 14(1)-14(3) execute the instructions for optimizing the operation or operations of the apparatus 12. In the example described above in step 46, the instructions for adjusting the power supplied to the photoreceptors, bias charge roll, and/or full erase light would be transmitted to the photoreceptors, bias charge roll, and/or full erase light or another control system or systems for implementation. In step 50, the method for optimizing one or more operations of the apparatus 12 ends.

With the present invention, parts which have relaxed and/or changing tolerances can be used without sacrificing performance of the apparatus 12. These parts with relaxed tolerances are less expensive which reduces the overall cost of the apparatus 12.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for optimizing performance of at least one operation performed by an apparatus, comprising:

interrogating one part of a plurality of parts being coupled to adjustable power supplies within the apparatus, each of said parts including a respective information component comprising memory and a processor;

receiving, from the information component of the interrogated, information about the one part transmitted from the information component of the one part;

determining if any other of the plurality of parts need to be interrogated;

interrogating each of the determined other parts to receive information about each of the other parts from the respective information components of the other parts;

determining instructions for optimizing the at least one operation of the apparatus based on the received information;

transmitting the instructions to the information component of at least one interrogated part for execution by the processor to optimize the at least one operation;

identifying the at least one operation being optimized;

comparing for at least one of the interrogated parts, the received information about the part against stored information to obtain a difference; and using the difference to determine the instructions for optimizing the at least one operation.

2. The method as set forth in claim 1 wherein the information received from at least one of the interrogated parts comprises at least one functional parameter of the at least one part.

3. The method as set forth in claim 1 wherein the information received from at least one of the interrogated parts comprises at least one algorithm of the part.

4. The method as set forth in claim 1, wherein receiving the information about the interrogated parts involves receiving wireless communication.

5. The method as set forth in claim 1, wherein the apparatus is one of a copier and a printer.

6. The method as set forth in claim 5, wherein the received information includes characteristics of at least one of a photoreceptor, a laser diode, a bias charge roll, and a full erase light.

7. A computer readable medium having stored thereon instructions for optimizing performance of an operation performed by an apparatus which, when executed by a processor, cause the processor to perform the steps of:

interrogating one part of a plurality of parts being coupled to adjustable power supplies within the apparatus, each of said parts including a respective information component comprising memory and a processor;

receiving, from the information component of the interrogated part, information about the one part transmitted from the information component of the one part;

determining if any other of the plurality of parts need to be interrogated;

interrogating each of the determined other parts to receive information about each of the other parts from the respective information components of the other parts;

determining instructions for optimizing the at least one operation of the apparatus based on the received information;

transmitting the instructions to the information component of at least one interrogated part for execution by the processor to optimize the at least one operation;

identifying the at least one operation being optimized;

comparing, for at least one of the interrogated parts, the received information about the part against stored information to obtain a differences; and using the differences to determine the instructions for optimizing the at least one operation.

8. The medium as set forth in claim 7 wherein the information received from at least one of the interrogated parts comprises at least one functional parameter of the part.

9. The medium as set forth in claim 7 wherein the information received from at least one of the interrogated parts comprises at least one algorithm of the part.

10. The medium as set forth in claim 7, wherein receiving the information about the interrogated parts involves receiving wireless communication.

11. The medium as set forth in claim 7, wherein the apparatus is one of a copier and a printer.

12. The medium as set forth in claim 11, wherein the received information includes characteristics of at least one of a photoreceptor, a laser diode, a bias charge roll, and a full erase light.

13. An apparatus comprising;

a plurality of parts being coupled to adjustable power supplies within the apparatus, each said part including a respective information component comprising memory, a processor and a transceiver, said memory having stored therein data about the at least one part;

an interrogation system that interrogates one of the parts of the apparatus for the data stored in the memory of the part;

a determination system that determines if any other of the plurality of parts are involved in the operation and need to be interrogated by the interrogation system for the data stored in their respective memories;

an optimization processing system that receives the data, which was stored in the memory and transmitted from the transceiver of the information component of each interrogated part, determines instructions for optimizing at least one operation of apparatus based on the received data, and transmits the instructions to the transceiver of the information component of at least one interrogated part for execution by the processor of the information; and an identification system that identifies that at least one operation being optimized;

wherein the optimization processing system compares the received information about the at least one of the interrogated parts against stored information to obtain a difference and uses the difference to determine the instructions for optimizing the at least one operation.

14. The apparatus as set forth in claim 13 wherein the data in the information component of at least one of the interrogated parts comprises at least one functional parameter of the part.

15. The apparatus as set forth in claim 13 wherein the data in the information component of at least one of the interrogated parts comprises at least one algorithm of the part.

16. The apparatus as set forth in claim 13, wherein the optimization processing system comprises a transceiver for receiving the data wirelessly transmitted from the interrogated parts.

17. The apparatus as set forth in claim 13, wherein the apparatus is one of a copier and a printer.

18. The apparatus as set forth in claim 17, wherein the received data includes characteristics of at least one of a photoreceptor, a laser diode, a bias charge roll, and a full erase light.

* * * * *